United States Patent [19]

Nudelman et al.

[11] 4,130,441
[45] Dec. 19, 1978

[54] CEMENT AND PROCESS FOR PRODUCING SAME

[76] Inventors: Boris I. Nudelman, Chilanzar, kvartal 8, 27, kv. 48; Alexandr S. Sventsitsky, Severo-Vostok, 50, kv. 64; Marsel Y. Bikbau, massiv Junus-Abad, B-2, 21, kv. 58; Ada M. Prikhozhan, F-100, Mukimi, 1, kv. 95; Isak M. Ibragimov, ulitsa Biruni, proezd Temir-Tau, 38, all of Tashkent, U.S.S.R.

[21] Appl. No.: 817,035

[22] Filed: Jul. 19, 1977

[30] Foreign Application Priority Data

Aug. 20, 1976 [SU] U.S.S.R. .................. 2397382

[51] Int. Cl.$^2$ ................................ C04B 7/02
[52] U.S. Cl. ........................ 106/89; 106/100
[58] Field of Search .................. 106/89, 100, 104

[56] References Cited

U.S. PATENT DOCUMENTS

| | | | |
|---|---|---|---|
| 3,628,973 | 12/1971 | Greening et al. | 106/100 |
| 3,864,138 | 2/1975 | Uchikawa et al. | 106/89 |

*Primary Examiner*—James Poer
*Attorney, Agent, or Firm*—Robert E. Burns; Emmanuel J. Lobato; Bruce L. Adams

[57] ABSTRACT

A cement is disclosed having the following composition in per cent by weight:

| | |
|---|---|
| (I) clinker minerals: | |
| (a) a highly-basic calcium chlorosilicate | 35 to 75 |
| (b) calcium chloro-orthosilicate | 10 to 55 |
| (c) calcium chloroaluminate | 2 to 30 |
| (d) calcium chloroalumoferrite | 4 to 16 |
| (2) calcium oxychloride | 0.5 to 2 |
| (3) calcium chloride chemisorbed on the clinker materials | 1.2 to 2.5 |

2 Claims, No Drawings

CEMENT AND PROCESS FOR PRODUCING SAME

BACKGROUND OF THE INVENTION

The present invention relates to the production of building materials and, more specifically, to cements and processes for producing same.

Cements consisting of highly-basic calcium silicate (alite), calcium orthosilicate (belite), calcium aluminate and calcium alumoferrite are known. In the stage of preparation of grouts and concretes, cements are added with chlorides, mainly calcium chloride, to speed up the process of cement hydration and intensify hardening of said grouts and concretes at both negative and positive temperatures.

A process for producing the above-described cements which is known in the art comprises calcination of a raw mixture consisting of calcareous, siliceous, aluminous and ferrous components at a temperature within the range of from 1,400 to 1,450° C, followed by grinding of the resulting cement clinker. In the stage of preparation of grouts and concretes, the cements are added, for the above-mentioned purpose, with chlorides, mainly calcium chloride.

The prior art cements have a low hydration speed at low positive (0 to 5° C) and negative (down to −20° C) temperatures. To speed-up the process of cement hydration at said temperatures, cement is added, during the preparation of grouts and concretes, with chlorides such as calcium chloride. With increasing amount of chlorides, the effect produced thereby in concretes or grouts is also increased. Therewith, however, corrosion of steel reinforcement in said concretes and grouts is more pronounced, especially during heat-humid treatment of the latter. This restricts the amount of the chloride additives to the range of from 2 to 2.5% by weight of the cement under normal conditions of hardening of concretes and grouts or 1 to 1.5% by weight of the cement in the case of heat-humid treatment of said concretes and grouts.

A disadvantage of the prior art process for producing said cements resides in a high calcination temperature causing great consumption rates of the fuel. Furthermore, the cement clinker produced at this temperature has a low grinding ability, resulting in increased power consumption for such grinding.

SUMMARY OF THE INVENTION

It is an object of the present invention to provide a cement composition which makes it possible to accelerate the hydration of cement and hardening of concretes and grouts based on said cement at positive and negative temperatures.

It is another object of the present invention to provide a cement composition which makes it possible to avoid the corrosion of steel reinforcement in concretes and grouts.

It is a further object of the present invention to provide a process for producing a cement with the above-mentioned properties which makes it possible to perform calcination of a raw mixture at lower temperatures and to obtain, as a result of such calcination, a cement clinker possessing a high grinding ability.

These and other objects of the present invention are accomplished by a cement containing clinker minerals, such as a highly basic calcium silicate, calcium orthosilicate, calcium aluminate and calcium alumoferrite; in accordance with the present invention, as the highly-basic calcium silicate use is made of a highly basic calcium chlorosilicate; as calcium orthosilicate - calcium chloro-orthosilicate; as calcium aluminate - calcium chloroaluminate; as calcium alumoferrite - calcium chloroalumoferrite; it also contains calcium oxychloride and calcium chloride chemisorbed on said clinker minerals, the components being contained in the following proportions in per cent by weight:

| | |
|---|---|
| highly-basic calcium chlorosilicate | 35 to 75 |
| calcium chloro-orthosilicate | 10 to 55 |
| calcium chloroaluminate | 2 to 30 |
| calcium chloroalumoferrite | 4 to 16 |
| calcium oxychloride | 0.5 to 2 |
| calcium chloride chemisorbed on said clinker minerals | 1.2 to 2.5. |

The cement according to the present invention has a high hydration rate at both positive and negative temperatures. This is caused by the presence of chlorine-ion in the liquid phase of concretes and grouts being hardened and by a high hydration activity of the clinker minerals incorporated in the cement according to the present invention. No corrosion of steel reinforcement is observed in concretes and grouts based on this cement.

The cement according to the present invention is produced by a process which comprises calcination of a raw mixture containing calcareous, siliceous, aluminous, ferrous components, followed by grinding of the resulting cement clinker, wherein, in accordance with the present invention a raw mixture is used which contains, in addition to the above-mentioned components, calcium chloride and a magnesium-containing component; said components being present in the following proportions in per cent by weight:

| | |
|---|---|
| calcareous component (calculated for CaO) | 32.4 to 40.7 |
| siliceous component (calculated for $SiO_2$) | 12.5 to 18.8 |
| aluminous component (calculated for $Al_2O_3$) | 2.4 to 11.5 |
| ferrous component (calculated for $Fe_2O_3$) | 1.2 to 4 |
| calcium chloride | 6 to 20 |
| magnesium-containing component (calculated for MgO) | 1.5 to 4 |
| losses at calcination | the balance. |

Calcination of the raw mixture is then performed at a temperature within the range of from 1,000 to 1,200° C.

The process according to the present invention makes it possible to reduce the calcination temperature down to 1,000 to 1,200° C and lower the fuel consumption. The cement clinker produced at such temperatures possesses a considerable porosity (within the range of from 45 to 65%) and, therefore, a high grinding ability which makes it possible to lower power consumption rate for such grinding by 2 to 2.5 times.

DESCRIPTION OF THE INVENTION

The cement according to the present invention is produced in the following manner.

The starting components are subjected to separate or joint grinding (the wet grinding is followed by homogenization of the raw mixture). The grinding can be performed both in the presence of water (wet grinding) and without it (dry grinding). In wet grinding water is added in an amount of from 25 to 33% of the total weight of the starting components. In the case of wet grinding of the starting components, calcium chloride can be used either as a dry product or in the form of aqueous solutions thereof of a required concentration. After dry grinding the resulting raw mixture can be granulated with the addition of water in an amount of from 6 to 9% to produce pellets with a diameter of from 5 to 20mm.

From the thus-prepared raw mixture a cement clinker is produced by supplying the raw mixture in the form of raw flour, granules or slurry (raw mixture with water) into a thermal unit, wherein calcination of the raw mixture is performed at a temperature within the range of from 1,000 to 1,200° C. To obtain cement, the clinker is discharged from the thermal unit and subjected to grinding.

Calcium chloride, as a component of the raw mixture, can be used both in pure form and in the form of a calcium chloride containing component. Said component can be introduced into the raw mixture either in the stage of grinding of the components or directly into the calcination thermal unit so that calcium chloride is fed separately from a mixture of other components; said feed of calcium chloride and the mixture of other components is effected continuously.

For a better understanding of the present invention the following examples illustrating the cement production are given hereinbelow. In all the examples the grinding ability of the cement is determined by energy consumption for grinding thereof to a required fineness. Corrosion of steel reinforcement in samples of concrete based on the cement according to the present invention is determined by a quantitative method accounting for weight losses of reinforcing rods upon storage of the samples in the air with the 100% relative humidity at the temperature of 20° C.

EXAMPLE 1

A raw mixture is prepared having the following composition, percent by weight:

| | |
|---|---|
| limestone (calculated for CaO) | 40.7 |
| quartz sand (calculated for SiO$_2$) | 18.8 |
| commercial alumina (calculated for Al$_2$O$_3$) | 2.4 |
| pyrite cinders (calculated for Fe$_2$O$_3$) | 1.2 |
| commercial calcium chloride (calculated for CaCl$_2$) | 6.0 |
| magnesite (calculated for MgO) | 1.5 |
| losses at calcination | 29.4. |

Said components are subjected to joint dry grinding. The ground product has a residue of not more than 10% by weight on a sieve with the hole diameter of 80 mcm. The resulting raw mixture is granulated to produce pellets with a diameter of from 10 to 15 mm.

The granulated raw mixture is fed into a furnace, wherein calcination is effected at the temperature of 1,000° C till the clinker-formation process is completed. To obtain cement, the clinker is discharged from the furnace and subjected to grinding. Specific power consumption for the grinding of this cement clinker to the residue of 13.3% by weight on a sieve with the hole diameter of 80 mcm is 11.1 kWt.hr/ton, while to the residue of 4.4% this specific power consumption is 38.1 kWt.hr/ton.

The resulting cement has the following composition, per cent by weight:

| | |
|---|---|
| highly-basic calcium chlorosilicate | 35 |
| calcium chloro-orthosilicate | 55 |
| calcium chloroaluminate | 4.3 |
| calcium chloroalumoferrite | 4 |
| calcium oxychloride | 0.5 |

| | |
|---|---|
| calcium chloride chemisorbed on the clinker minerals | 1.2. |

No corrosion of steel reinforcement is observed in samples of concretes produced from the above cement.

EXAMPLE 2

A raw mixture is prepared having the following composition, percent by weight:

| | |
|---|---|
| magnesial limestone, calculated for: | |
| CaO | 39.6 |
| MgO | 4.0 |
| tripoli earth (calculated for SiO$_2$) | 15.8 |
| china clay (calculated for Al$_2$O$_3$) | 2.9 |
| pyrite cinders (calculated for Fe$_2$O$_3$) | 2.6 |
| commercial calcium chloride (calculated for CaCl$_2$) | 10 |
| losses at calcination | 25.1. |

Grinding of said components, granulation of the raw mixture, grinding of the resulting cement clinker are performed in a manner similar to that described in Example 1 hereinbefore. Calcination of the raw mixture is performed at the temperature of 1,200° C. Specific power consumption rate for grinding of the cement clinker to the residue of 10.7% on a sieve with the hole diameter of 80 mcm is 12.7 kWt.hr/ton; that for the residue of 5.2% is 37.6kWt.hr/ton.

The thus-produced cement has the following composition, percent by weight:

| | |
|---|---|
| highly basic calcium chlorosilicate | 75 |
| calcium chloro-orthosilicate | 10 |
| calcium chloroaluminate | 2 |
| calcium chloroalumoferrite | 8.5 |
| calcium oxychloride | 2 |
| calcium chloride chemisorbed on the clinker minerals | 2.5. |

No corrosion of steel reinforcement in concrete samples made of the above cement is observed.

EXAMPLE 3

A raw mixture is prepared having the following composition, percent by weight:

| | |
|---|---|
| chalk (calculated for CaO) | 36.0 |
| diatomite (calculated for SiO$_2$) | 12.5 |
| china clay (calculated for Al$_2$O$_3$) | 11.5 |
| pyrite cinders (calculated for Fe$_2$O$_3$) | 1.4 |
| magnesite (calculated for MgO) | 2.5 |
| commercial calcium chloride (calculated for CaCl$_2$) | 12 |
| losses at calcination | 24.1. |

Said components are subjected to wet grinding; in doing so, calcium chloride is fed to the grinding stage in the form of a 20% aqueous solution. The ground product is fed into a rotary furnace, wherein calcination of the raw mixture is performed at the temperature of 1,100° C for 1 hour. The resulting cement clinker is discharged from the furnace and subjected to grinding. Specific power consumption rate for grinding of the cement clinker to the residue of 12.1% on a sieve with the hole diameter of 80 mcm is 11.4 kWt.hr/ton that for the residue of 4.5% is 40.4 kWt.hr/ton.

The resulting cement has the following composition, percent by weight:

| | |
|---|---|
| highly-basic calcium chlorosilicate | 49.3 |
| calcium chloro-orthosilicate | 15 |
| calcium chloroaluminate | 30 |
| calcium chloroalumoferrite | 4 |
| calcium oxychloride | 0.5 |
| calcium chloride chemisorbed on the clinker minerals | 1.2 |

No corrosion of steel reinforcement is observed in concrete samples produced from the above cement.

EXAMPLE 4

A raw mixture is prepared having the following composition, percent by weight:

| | |
|---|---|
| marbled limestone (calculated for CaO) | 32.4 |
| quartz sand (calculated for $SiO_2$) | 14.45 |
| china clay (calculated for $Al_2O_3$) | 6.2 |
| pyrite cinders (calculated for $Fe_2O_3$) | 4.0 |
| periclase (MgO) | 2.0 |
| commercial calcium chloride (calculated for $CaCl_2$) | 20 |
| losses at calcination | 20.95 |

Grinding of the above-mentioned components, granulation of the raw mixture and calcination thereof, grinding of the resulting cement clinker are performed by the procedure described in Example 1 hereinbelow. Specific power consumption rate for grinding the cement clinker to the residue of 12.5% on a sieve with the hole diameter of 80 mcm is 12.0 kWt.hr/ton; that for the residue of 5.7% is 36.9 kWt.hr/ton.

The thus-produced cement has the following composition, percent by weight:

| | |
|---|---|
| highly-basic calcium chlorosilicate | 40 |
| calcium chloro-orthosilicate | 30.7 |
| calcium chloroaluminate | 10 |
| calcium chloroalumoferrite | 16 |
| calcium oxychloride | 1.8 |
| calcium chloride chemisorbed on the clinker minerals | 1.5 |

No corrosion of steel reinforcement in samples of concrete produced from the above cement is observed.

In Tables 1 and 2 hereinbelow there are given rates of hydration of the cement according to the present invention (Examples 1 to 4) and Portland cement taken as a control for the comparison purposes; also shown in the Tables are hardening rates for samples made from these cements. Hydration rate of the cement according to the present invention and that of Portland cement are determined by means of a quantitative X-ray analysis. Hardening rate of samples made from the cement according to the present invention and that of samples made of Portland cement is determined as an ultimate compression strength for samples with the dimensions of 4×4×16 cm consisting of 1 part by weight of the cement according to the present invention or Portland cement, 3 parts by weight of quartz sand and 0.5 part by weight of water tested after 1, 3, 7 and 28 days of hardening at a temperature within the range of from −10 to +20° C. Samples hardened at negative temperatures had been previously maintained at the temperature of 20° C for 3 hours.

Said Portland cement employed as a control cement for the comparison purposes is produced from a Portland cement clinker prepared at the temperature of 1,450° C and having the following composition, percent by weight:

| | |
|---|---|
| highly-basic calcium silicate | 63 |
| calcium orthosilicate | 19 |
| calcium aluminate | 4 |
| calcium alumoferrite | 14 | by grinding thereof to the residues of 12.5% and 6.0% on a sieve with the hole diameter of 80 mcm. Therewith, specific power consumption rate for grinding of the Portland cement clinker is 39.0 and 92.5 kWt.hr/ton respectively.

In one case said Portland cement is added, in the stage of its mixing with water, with calcium chloride in the amount of 2% by weight of the Portland cement; in another case a non-added Portland cement is tested. In the former case corrosion of steel reinforcement in samples as determined by the above-described method is 2.7% by weight after storage of the samples for 28 days and 4.2% by weight after storage of the samples for one year. In the latter case no corrosion of steel reinforcement in the samples is observed.

Table 1

Hydration rate (wt. %) of the cement according to Examples 1 to 4 and Portland cement hydrated at different temperatures for 28 days

| Example No. | +20° C | | | | +5° C | | | | −10° C | | | |
|---|---|---|---|---|---|---|---|---|---|---|---|---|
| | 1 day | 3 days | 7 days | 28 days | 1 day | 3 days | 7 75 | 28 days | 1 days | 3 days | 7 days | 28 days |
| 1 | 45 | 57 | 64 | 74 | 31 | 37 | 46 | 59 | 29 | 34 | 42 | 55 |
| 2 | 57 | 70 | 74 | 87 | 47 | 59 | 64 | 69 | 33 | 45 | 57 | 67 |
| 3 | 49 | 67 | 80 | 92 | 45 | 54 | 67 | 79 | 30 | 42 | 56 | 69 |
| 4 | 42 | 55 | 78 | 94 | 40 | 50 | 62 | 77 | 27 | 34 | 47 | 74 |
| non-added Portland cement | 30 | 42 | 54 | 59 | 11 | 17 | 21 | 23 | 5 | 5 | 6 | 7 |
| Portland cement added with wt. % of $CaCl_2$ | 44 | 60 | 69 | | 27 | 38 | 42 | 49 | 21 | 25 | 30 | 33 |

Table 2

Ultimate compression strength (kgf/cm²) of samples based on the cement of Examples 1 to 4 and Portland cement hardened at different temperatures for 28 days

| Example No. | +20° C | | | | +5° C | | | | −20° C | | | |
|---|---|---|---|---|---|---|---|---|---|---|---|---|
| | 1 day | 3 days | 7 days | 28 days | 1 day | 3 days | 7 days | 28 days | 1 day | 3 days | 7 days | 28 days |
| 1 | 150 | 247 | 387 | 420 | 95 | 164 | 276 | 320 | 88 | 149 | 255 | 280 |
| 2 | 208 | 366 | 472 | 589 | 174 | 215 | 299 | 376 | 115 | 249 | 310 | 348 |

Table 2-continued

Ultimate compression strength (kgf/cm²) of samples based on the cement of Examples 1 to 4 and Portland cement hardened at different temperatures for 28 days

| Example No. | +20° C | | | | +5° C | | | | −20° C | | | |
|---|---|---|---|---|---|---|---|---|---|---|---|---|
| | 1 day | 3 days | 7 days | 28 days | 1 day | 3 days | 7 days | 28 days | 1 day | 3 days | 7 days | 28 days |
| 3 | 170 | 260 | 449 | 507 | 104 | 249 | 367 | 402 | 85 | 188 | 296 | 371 |
| 4 | 137 | 244 | 392 | 430 | 92 | 225 | 309 | 372 | 82 | 192 | 257 | 320 |
| Non-added Portland cement | 64 | 170 | 288 | 407 | 78 | 155 | 249 | 380 | is not hardened | 7 | 28 | 69 |
| Portland cement added with 2 wt. % of $CaCl_2$ | 148 | 312 | 425 | 512 | 112 | 205 | 340 | 395 | 52 | 82 | 214 | 300 |

What is claimed is:

1. A cement consisting of
   (a) clinker minerals, viz. a highly-basic calcium chlorosilicate, calcium ortho-chlorosilicate, calcium chloroaluminate, calcium chloroalumoferrite;
   (b) calcium oxychloride;
   (c) calcium chloride chemisorbed on said clinker materials, the components being present in the following proportions, percent by weight:

| | |
|---|---|
| a highly basic calcium chlorosilicate | 35 to 75 |
| calcium chloro-orthosilicate | 10 to 55 |
| calcium chloroaluminate | 2 to 30 |
| calcium chloroalumoferrite | 4 to 16 |
| calcium oxychloride | 0.5 to 2 |
| calcium chloride chemisorbed on said minerals | 1.2 to 2.5 |

2. A process for producing cement comprising calcining a raw mixture at a temperature within the range of from 1,000 to 1,200° C, said raw mixture consisting essentially of calcareous, silicaceous, aluminous, ferrous and magnesium-containing components and calcium chloride in the following proportions in percent by weight:

| | |
|---|---|
| calcareous component (calculated for CaO) | 32.4 to 40.7 |
| silicaceous component (calculated for $SiO_2$) | 12.5 to 18.5 |
| aluminous component (calculated for $Al_2O_3$) | 2.4 to 11.5 |
| ferrous component (calculated for $Fe_2O_3$) | 1.2 to 4 |
| magnesium-containing component (calculated for MgO) | 1.5 to 4 |
| calcium chloride | 6 to 20 |
| losses at calcination | the balance; | the cement clinker resulting from calcination is then subjected to grinding.

* * * * *